Oct. 12, 1937.  C. S. HAZARD  2,095,329
COMPUTING APPARATUS
Original Filed May 24, 1935    5 Sheets-Sheet 3
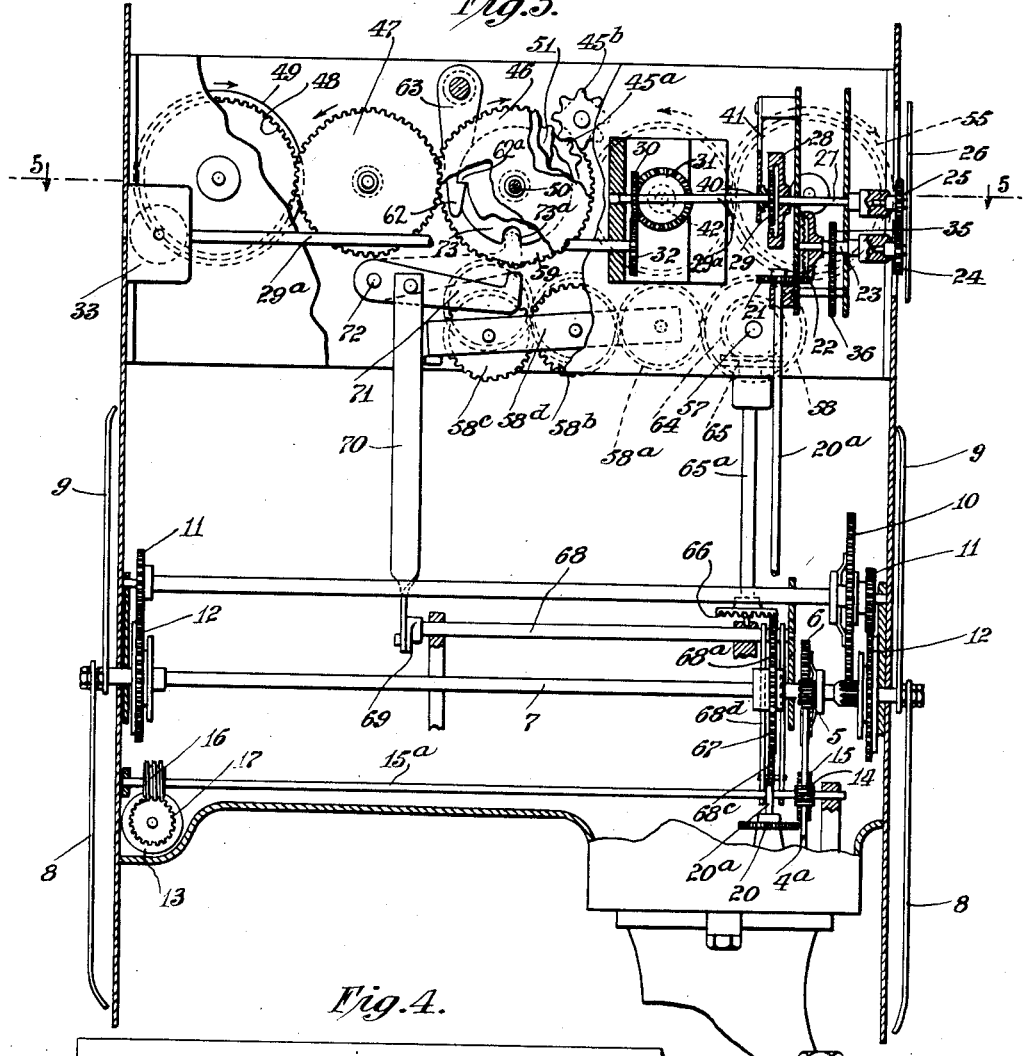
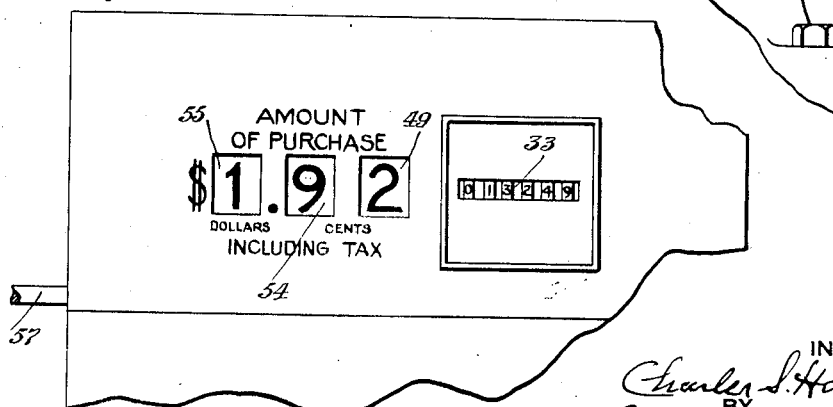
INVENTOR
Charles S. Hazard
BY
Redding, Greeley & O'Shea
ATTORNEY Oct. 12, 1937.    C. S. HAZARD    2,095,329
COMPUTING APPARATUS
Original Filed May 24, 1935    5 Sheets-Sheet 4
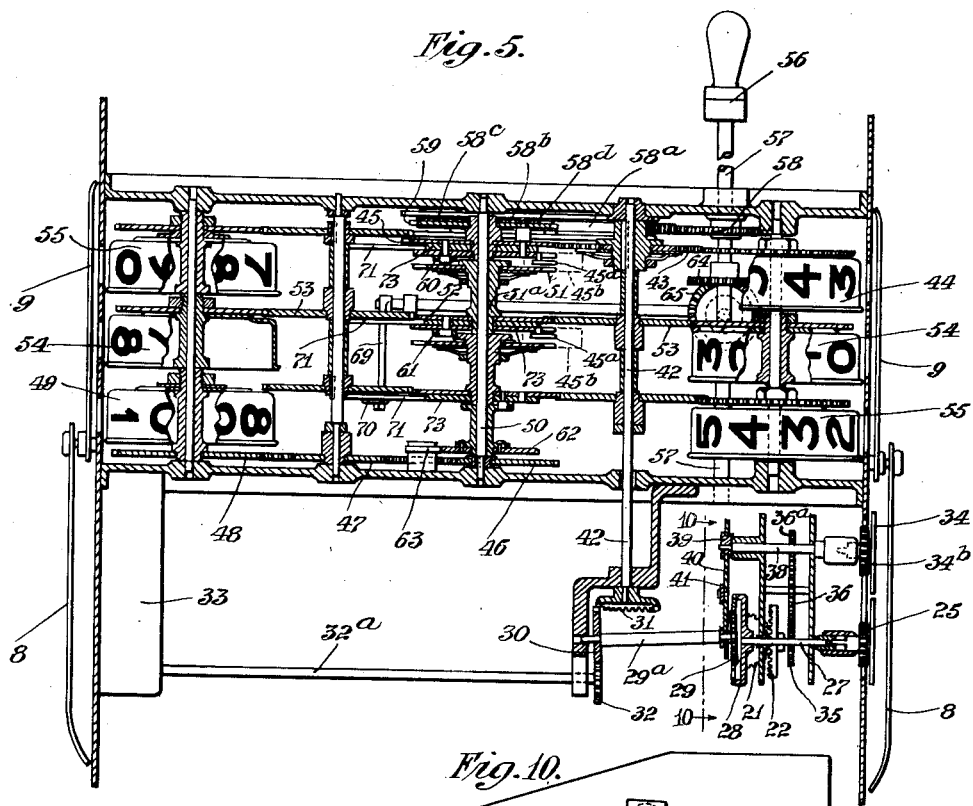
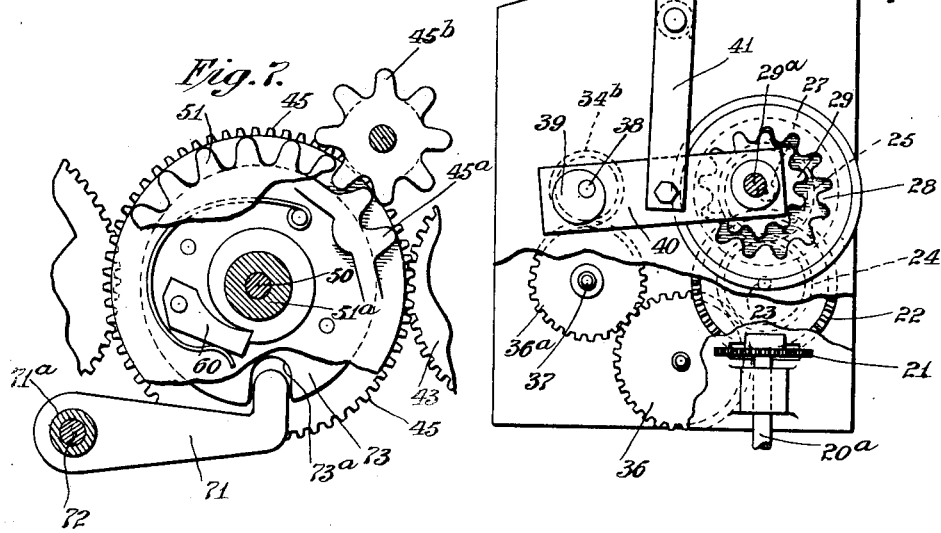
INVENTOR
Charles S. Hazard
BY
Redding, Greeley & O'Shea
ATTORNEY Oct. 12, 1937.   C. S. HAZARD   2,095,329
COMPUTING APPARATUS
Original Filed May 24, 1935   5 Sheets—Sheet 5
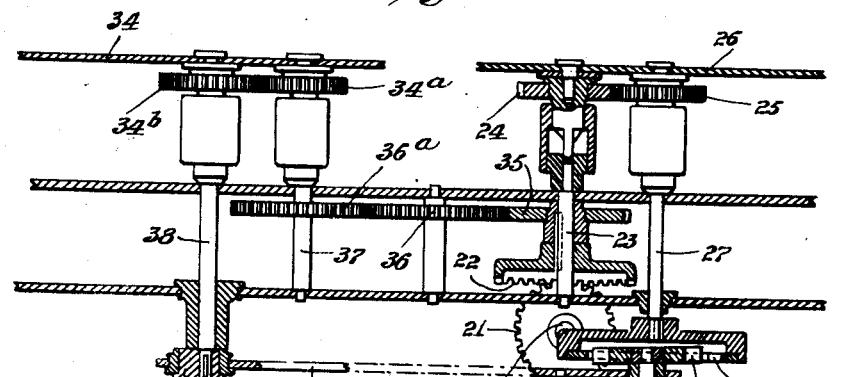
Fig. 11.
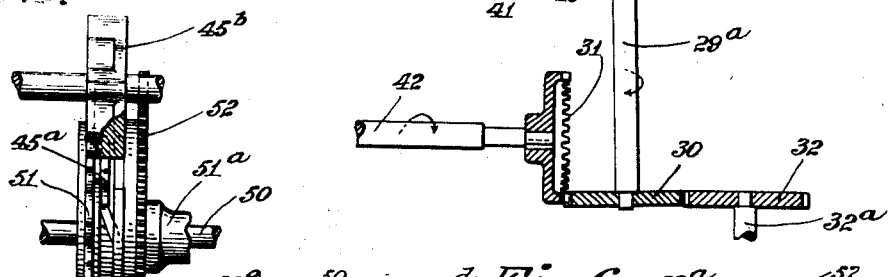
Fig. 2.
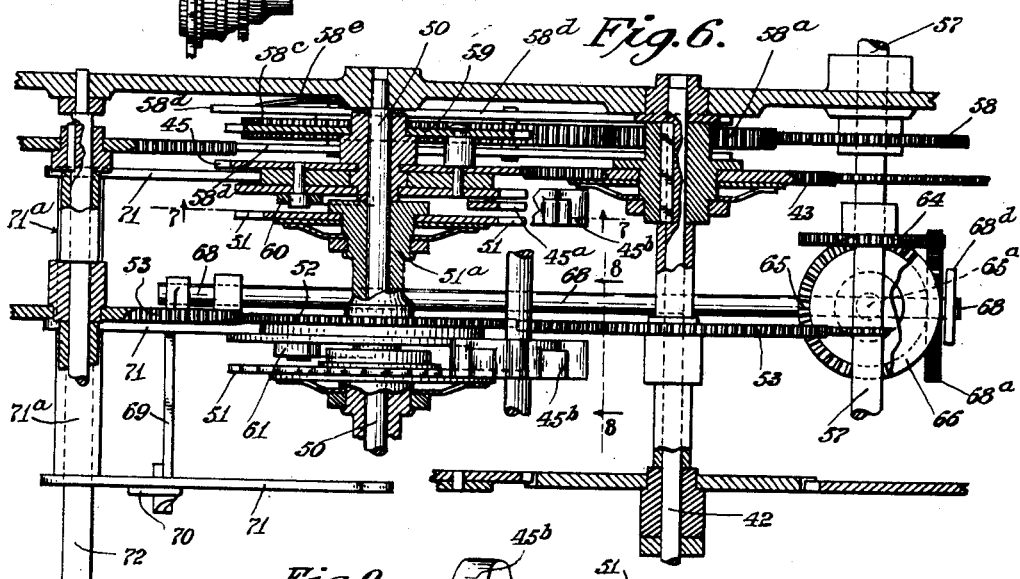
Fig. 6.
Fig. 9.
INVENTOR
Charles S. Hazard
BY
Redding, Greeley & O'Shea
ATTORNEY Patented Oct. 12, 1937

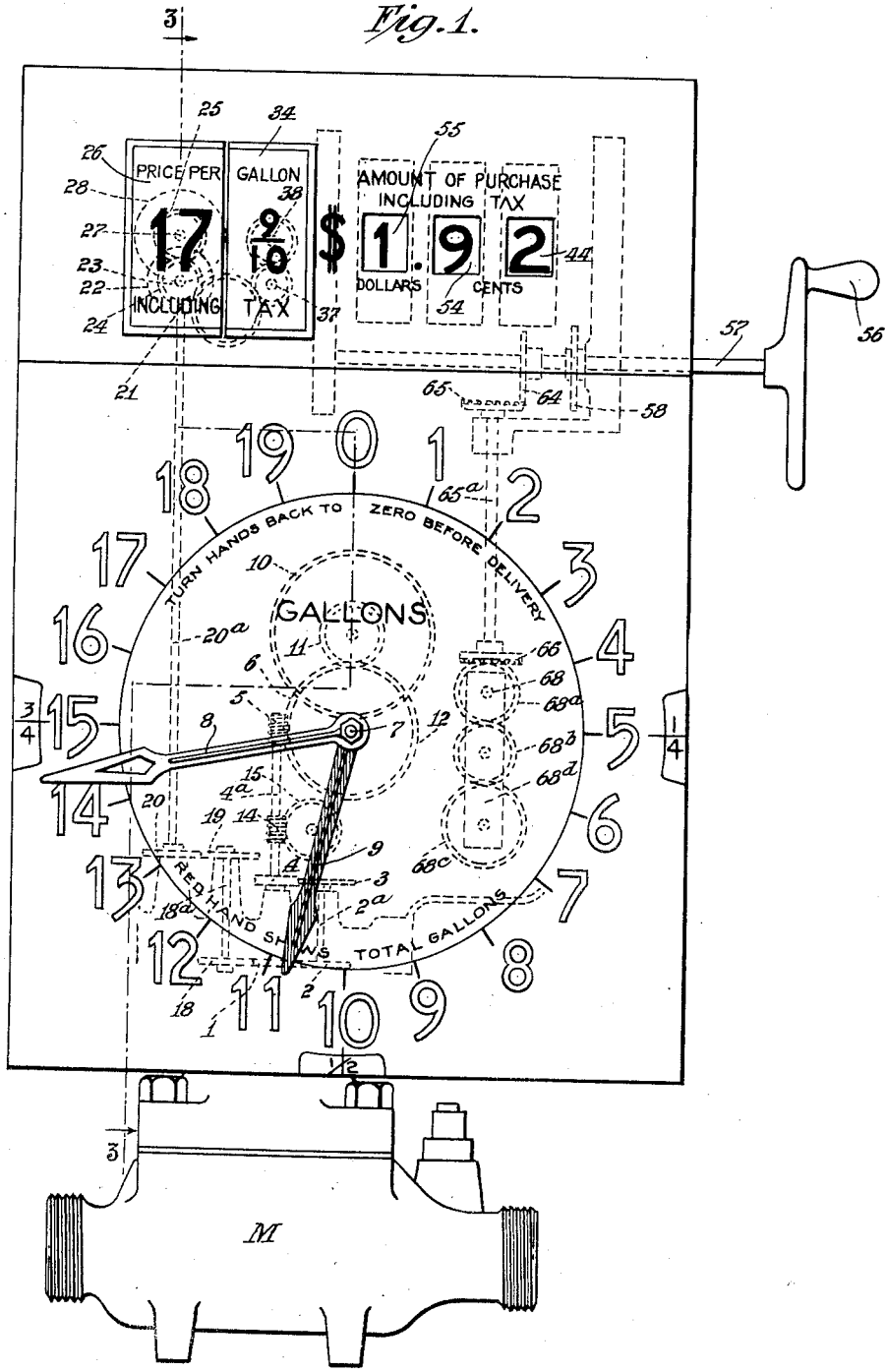

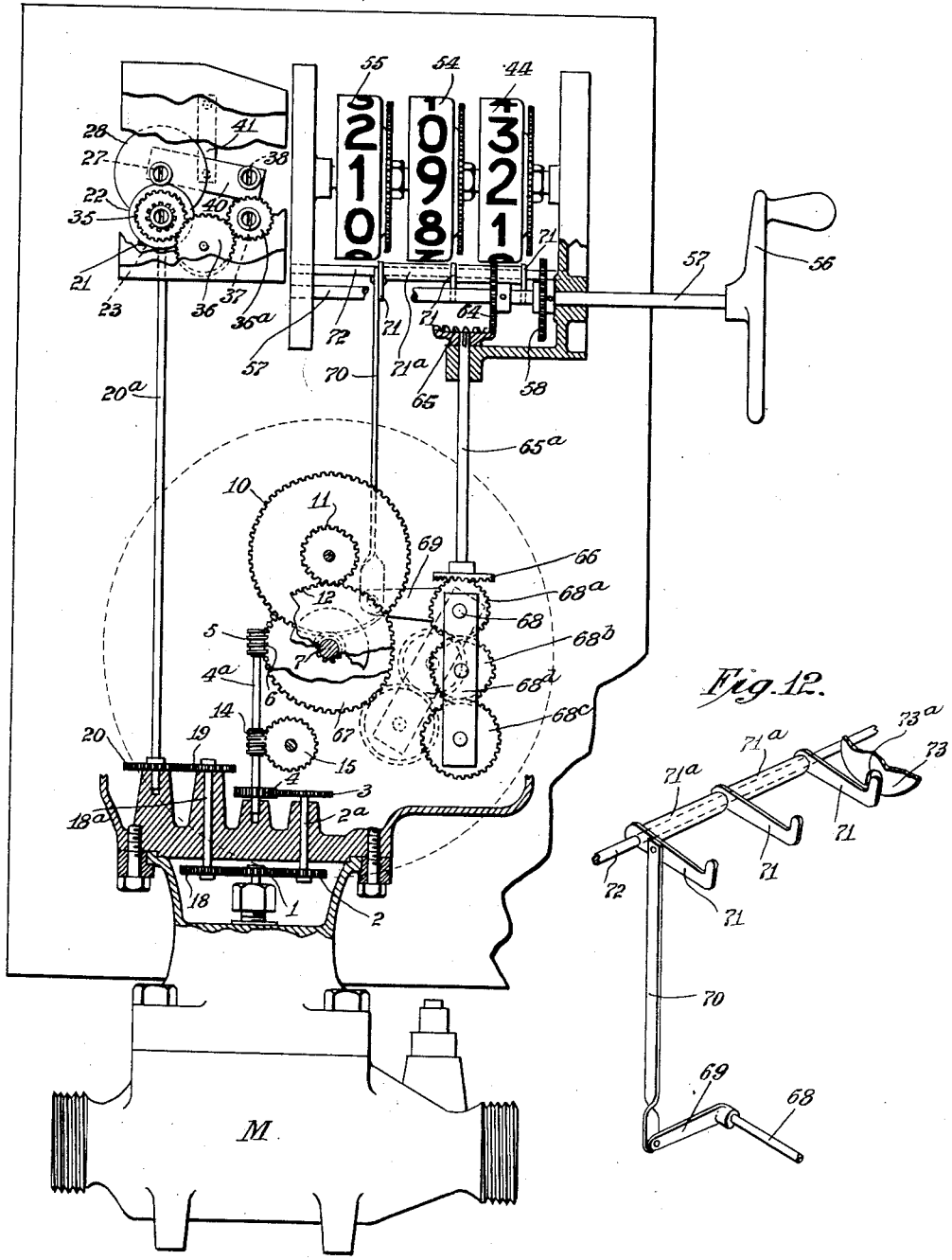

2,095,329

UNITED STATES PATENT OFFICE 2,095,329

COMPUTING APPARATUS

Charles S. Hazard, New York, N. Y., assignor to Neptune Meter Company, New York, N. Y., a corporation of New Jersey Original application May 24, 1935, Serial No. 23,148. Patent No. 2,069,184, dated January 26, 1937. Divided and this application November 27, 1935, Serial No. 51,729

2 Claims. (Cl. 235—144)

REISSUED

JUL 29 1941

This application is a division of applicant's co-pending application Ser. No. 23,148, for Computing dispensing apparatus for gasoline and the like, filed May 24, 1935.

The apparatus in which the present invention is exemplified has been designed with particular reference to the dispensing of gasoline in which there is exhibited to the customer not only the number of gallons delivered, but the price per gallon and the cost to the customer of the quantity delivered. The invention is particularly concerned with means for resetting to zero the cash indicator device which is incorporated in the apparatus and with means to prevent improper operation of the volume indicator. The construction is such as to permit ready adjustment of the apparatus in accordance with variations in unit prices and provision is made whereby totals are registered as usual for the benefit of the seller.

The invention will be fully described hereinafter with reference to the accompanying drawings in which an exemplification of the invention is illustrated, and in which:

Figure 1 is a view in front elevation of an apparatus in which the invention is incorporated, a meter of known type being also shown.

Figure 2 is a view of the same, partly in vertical section and partly in elevation, with the dial plate removed.

Figure 3 is a view in sectional elevation on the plane indicated by the broken line 3—3 of Figure 1.

Figure 4 is a fragmentary view of the apparatus as seen from the opposite side, showing a sale indicator and a totalizer for the convenience of the seller.

Figure 5 is a view in horizontal section on the plane indicated by the broken line 5—5 of Figure 3.

Figure 6 is an enlarged sectional detail view of some parts shown in Figure 5.

Figure 7 is a detail view in section on the plane indicated by the line 7—7 of Figure 6, partly broken away.

Figure 8 is a detail view in section on the plane indicated by the line 8—8 of Figure 6.

Figure 9 is a detail view in perspective of the Geneva movement shown in part in Figures 6 and 7.

Figure 10 is an enlarged detail view in section on the line 10—10 of Figure 5.

Figure 11 is a development of the gears shown in Figure 10, and

Figure 12 is a detail view in perspective of devices shown in part in Figure 2 to prevent resetting of the gallon indicator before the amount indicator is reset.

In the embodiment of the invention illustrated a meter, of the type often used in connection with gasoline dispensing apparatus, is shown at M. The gasoline indicating device and the sale price indicating device are actuated from the meter through independent trains of gearing. As shown in Figures 1 and 2, a gear 1 on the meter spindle meshes on one side with a gear 2, which, through a shaft 2a, gears 3, 4, worm 5 on shaft 4a, and worm gear 6, frictionally mounted on shaft 7, actuates the unit indicating hands 8, which sweep over the dials at the front and the rear sides of the apparatus. The secondary indicating hands 9, mounted loosely on the shaft 7, are driven therefrom through gears 10, 11 and 12 as usual and as shown in Figures 1, 2 and 3. The gallonage totalizer, which is sufficiently indicated at 13 in Figure 3, is driven through a worm 14 on the shaft 4a, a worm gear 15, and a worm 16 on the shaft 15a, and a worm gear 17 on the shaft of the totalizer.

The gear 1 also meshes with a gear 18, which, through its shaft 18a, gears 19, 20, shaft 20a and gears 21 and 22, drives shaft 23. In the embodiment of the invention shown, one of the change gears 24, 25, both of which are carried by a removable price tag 26 (which in this case shows cents), engages a socket on the shaft 23. The other change gear 25 similarly engages a socket on a shaft 27. It will be understood that each price tag 26 carries a different pair of gears to correspond to the integral portion of each price per gallon within the working range. The shaft 27 carries a gear 28, shown in Figure 3 and in detail in Figure 10, formed with internally cut teeth which engage the teeth of a gear 29 on a shaft 29a, which carries a gear 30 (see Figures 3 and 5). The latter meshes with a gear 32 which, through a shaft 32a, drives a continuous totalizer for dollars and cents which may be of usual construction and is sufficiently represented at 33 in Figures 3 and 5. The ratio of the gears 24 and 25 determines the ratio between the revolution of the meter and the revolution of the cash totalizer 33. It will be understood that the term "change gear" is employed for convenience and is not to be regarded as excluding any other arrangement which functions in like manner.

Other price tags 34, each bearing an indication of a fractional part of a cent, are provided for the purpose of effecting proper actuation of the totalizer. For this purpose a gear 35 (see Figure 2) on the shaft 23, through suitable reduction gearing 36, 36a, drives shaft 37 engaged through a socket at its end by a change gear 34a on the price tag 34. The other change gear 34b meshes with and drives shaft 38 on which is mounted an eccentric 39. The eccentric engages and oscillates a lever 40 in such manner as to cause the pinion 29, carried by the lever, to move in a circle, the lever 40 being engaged at its center by a short link 41 pivoted at a fixed point, so that the free end of the lever and the pinion carried thereby shall have an approximately circular motion. The teeth of the pinion 29 being always in engagement with the teeth of the internal gear 28 each oscillation of the lever 40 causes the gears 29 and 30, both carried by the shaft 29ª, to gain or lose a certain number of teeth with respect to the rotation of the shaft 27 from which the internal gear 28 receives motion. It will be understood that gain or loss is determined by the relative direction of rotation of the shafts 23 and 37. As the rotation thus imparted to gears 29 and 30, by reason of the oscillation of lever 40, is independent of rotation of the shaft 27, the effect is to add to or substract from the rotation of shaft 27 an increment or decrement determined by the ratio of the change gears 34ª and 34ᵇ, the relative direction of rotation of the shafts 23 and 37 determining, as above pointed out, whether the effect is an increment or a decrement.

For the operation of the sale amount indicating device a gear 31, which is engaged and driven by the gear 30, is fixed to a shaft 42, shown in Figures 3, 5 and 11, upon which is mounted frictionally a gear 43. The latter, as shown in Figure 6, engages and drives a gear 45 which is fixed on the shaft 50 to which is also fixed a gear 46, which, through gears 47 and 48, drives the rear units numeral wheel 49. Gear 45 has secured to it the teeth 45ª of a Geneva movement, which, in the rotation of the gear 45, engage and actuate a mutilated pinion 45ᵇ. The latter engages and actuates a gear 51, which is frictionally mounted on a hub 51ª on the shaft 50. Gear 52, fixed to the hub 51ª, drives the tens numeral wheel 54, both at the front of the apparatus and at the back thereof, through idler gears 53. The hundreds numeral wheel 55 is similarly driven through a Geneva movement actuated by the gear 52.

The resetting of the sale amount indicating device is accomplished by a hand crank 56 on a shaft 57 to which is fixed a gear 58. The latter meshes with the first of a train of gears 58ª, 58ᵇ and 58ᶜ mounted on a swinging frame 58ᵈ, which is pivoted on the axis of the first gear 58ª. The resistance offered by the friction imposed on gear 58ᶜ by flat spring 58ᵉ is such that the movement first imparted to the gear 58 causes the frame 58ᵈ to swing on its axis and to move the gear 58ᶜ into mesh with the gear 59, which is fixed to the gear 45 above mentioned. Continued rotation of the gear 58 and the gear 45 then resets the unit wheels 44 and 49. In the reverse rotation of the gear 45 a pawl 60 (see Figure 6) fixed to the gear 45, engages a notch of the hub 51ª so that continued rotation of the gear 45 rotates the hub 51ª and resets the tens wheel 54. Another pawl 61, fixed to a part of the Geneva movement, similarly picks up and resets the mechanism which drives the hundreds wheel 55. When all of the wheels of both sets of number wheels (on the front of the apparatus and on the back of the apparatus) have reached the zero position a tooth 62ª on the periphery of plate 62 fixed to the shaft 50 is engaged by pawl 63 mounted on the frame work and all of the wheels are brought to rest at zero.

For the resetting of the gallon indicator reverse rotation of the shaft 57 by the crank 56 acts through gears 64, 65, shaft 65ª and gear 66 and a train of gears 68ª, 68ᵇ and 68ᶜ carried by a frame 68ᵈ mounted to swing on the shaft which carries the first wheel of the series. The first movement of the resetting shaft causes the last gear 68ᶜ of the series to be moved into engagement with the gear 67 on the shaft 7 which carries the gallon indicating hands 8 and 9 and continued movement resets both hands 8 and 9 to the zero position, worm gear 6 slipping on its friction mounting.

Because the gallon indication is more prominent than the sale amount indication, it is desirable that the sale amount indicating device be reset first and the gallon indicating device thereafter. This will prevent the operator from inadvertently leaving a reading on the sale amount indicator after the gallon hand has been returned to zero. There is therefore provided interlocking mechanism which prevents engagement of the gear 68ᶜ with the gear 67, except when all of the numeral wheels 44, 54 and 55 are at zero. In this interlocking mechanism the side members of the frame 68ᵈ are fixed to the shaft 68, on the axis of which the frame swings. There is secured to the shaft 68 an arm 69, which is connected by a link 70 (see Figures 2, 6 and 12) to one of a set of three fingers 71 of a sleeve 71ª mounted on a fixed shaft or spindle 72 of the amount. When all the numeral wheels 44, 54 and 55 are at zero, and not until then, the three fingers 71 drop into notches 73ª of the respective plates 73 which rotate with the numeral wheels. If any one of the numeral wheels is not at zero the corresponding finger 71 would not drop into the notch and the swinging frame 68ᵈ would therefore be prevented from swinging far enough to engage the gear 68ᶜ with the gear 67. It is therefore impossible to set the gallon indicator unless all of the numeral wheels of the amount indicator have been reset to zero.

It will be understood that various changes in details of construction and arrangement can be made to suit different conditions of use and that the invention, therefore, is not restricted to the particular construction shown and described, except as set forth in the accompanying claims.

I claim as my invention:

1. In computing apparatus, the combination of an indicating device, resetting means, transmitting means from the resetting means to said indicating device normally out of operative engagement with said indicating device, a second indicating device, and means controlled by the second indicating device to determine operative engagement of the transmitting means with the first named indicating device.

2. In computing apparatus, the combination of an indicating device, resetting means, transmitting means from the resetting means to said indicating device normally out of operative engagement with said indicating device, a second indicating device comprising numeral wheels and including notched plates, the notched plates rotating with the numeral wheels, a shaft having fingers to enter the notches of the notched plates when all of the numeral wheels are in zero position, and means to prevent engagement of the transmitting means with the first named indicating device connected to an arm of said shaft and holding the transmitting means out of operative engagement with the first named indicating device, except when the fingers of the shaft enter the notches of the notched plates.

CHARLES S. HAZARD.